United States Patent [19]
Griffiths

[11] Patent Number: 5,715,671
[45] Date of Patent: Feb. 10, 1998

[54] CLEAN POWER GENERATION USING IGCC PROCESS

[75] Inventor: John Griffiths, Warlingham, United Kingdom

[73] Assignee: Jacobs Engineering Limited, Croydon, United Kingdom

[21] Appl. No.: 117,029

[22] PCT Filed: Mar. 6, 1992

[86] PCT No.: PCT/GB92/00407
§ 371 Date: Sep. 13, 1993
§ 102(e) Date: Sep. 13, 1993

[87] PCT Pub. No.: WO92/15775
PCT Pub. Date: Sep. 17, 1992

[30] Foreign Application Priority Data

Mar. 11, 1991 [GB] United Kingdom ............ 9105095

[51] Int. Cl.⁶ ..................................................... F02C 3/28
[52] U.S. Cl. .................................... 60/39.02; 60/39.12
[58] Field of Search .......................... 60/39.02, 39.12, 60/39.182

[56] References Cited

U.S. PATENT DOCUMENTS

| | | | |
|---|---|---|---|
| 4,019,314 | 4/1977 | Springmann | 60/39.02 |
| 4,132,065 | 1/1979 | McGann | 60/39.02 |
| 4,202,167 | 5/1980 | Suggitt et al. | 60/39.02 |
| 4,250,704 | 2/1981 | Bruckner et al. | 60/39.12 |
| 4,631,915 | 12/1986 | Frewer et al. | 60/39.12 |
| 4,785,622 | 11/1988 | Plumley et al. | 60/39.12 |
| 4,881,366 | 11/1989 | Nurse | 60/39.07 |
| 4,999,992 | 3/1991 | Nurse | 60/39.02 |
| 4,999,995 | 3/1991 | Nurse | 60/39.12 |

FOREIGN PATENT DOCUMENTS

| | | |
|---|---|---|
| 0159610 | 10/1985 | European Pat. Off. . |
| 0184137 | 6/1986 | European Pat. Off. . |
| 0259114 | 3/1988 | European Pat. Off. . |
| 2298596 | 8/1976 | France . |
| 2029855 | 3/1980 | United Kingdom . |

Primary Examiner—Louis J. Casaregola
Attorney, Agent, or Firm—Bacon & Thomas

[57] ABSTRACT

An integrated gasification combined cycle (IGCC) process and plant are provided in which an improvement in overall thermodynamic efficiency can be achieved by increasing the proportion of power generated by gas turbine(s) to that generated by steam turbine(s). This is achieved by placing an exothermic catalytic reactor downstream of the gasifier to pre-heat the gas turbine fuel gas which is supplemented by the addition of non-combustible gas.

10 Claims, 4 Drawing Sheets

CLEAN POWER GENERATION USING IGCC PROCESS

TECHNICAL FIELD

The present invention relates to an integrated gasification combined cycle (IGCC) process. More specifically, the present invention relates to an IGCC process having an improvement in overall thermodynamic efficiency by increasing the proportion of power generated by gas turbines to that generated by steam turbines. This is achieved by placing an exothermic catalytic reactor downstream of the gasification step to preheat the gas turbine fuel gas, which is supplemented by the addition of noncombustible gas, and expanding the cooled shifted gas stream.

BACKGROUND

Integrated Gasification Combined Cycle plants generate power in gas turbine(s) and steam turbine(s) wherein the steam for the steam turbine(s) is raised from the heat in the exhaust gas from the gas turbine(s) and, optionally, waste heat from the gasification step. Optionally, further power may be generated in a fuel gas expander situated between the gasification step and the gas turbine.

The thermodynamic efficiencies of gas turbines are generally higher than those of steam turbines whether the latter be of the back pressure or condensing type. Hence the greater the proportion of the IGCC power generated by the gas turbine(s) in relation to the proportion generated by the steam turbine(s), the higher the overall thermodynamic efficiency of the IGCC process. If the power generated by the gas turbine(s) is Pg and the power generated by the steam turbine(s) is Ps then the higher the value of Pg/Ps, the higher the efficiency of the IGCC process for the specified total power of (Pg+Ps).

The two major sources of heat from which steam can be raised are the waste heat from the gasification step and the exhaust gases from the gas turbine. The more efficient the gasification step i.e. the lower the quantity of energy converted to heat in order to carry out gasification, the lower the quantity of heat available from the gasification step to raise steam. The more efficient the gas turbine i.e. the higher the proportion of energy in the fuel gas converted to net shaft power, the lower the heat available in the exhaust gases to raise steam.

For higher IGCC thermodynamic efficiency, the gasification and gas turbine efficiencies should be preferably as high as possible. Furthermore, at high gasification and gas turbine efficiencies, an increase in the proportion of total IGCC power generated in the gas turbine becomes more significant in raising the overall thermodynamic efficiency of the IGCC.

The present invention increases IGCC efficiency by increasing the sensible heat carried by gas into the gas turbine and thereby increasing the proportion of IGCC power generated in the gas turbine.

It is well known to those versed in the art that using the gas turbine fuel, preferably supplemented with a non-combustible gas heat carrier, to carry waste heat into the gas turbine will increase gas turbine efficiency. Such non-combustible heat carrier can be a gas such as nitrogen or carbon dioxide, or water vapour either evaporated into the fuel gas in a saturator device or injected directly as steam. The additional non-combustible gas permits the mixture of combustible fuel gas and non-combustible gas to contain more sensible heat at a given temperature and hence to carry more heat into the gas turbine to improve efficiency. The non-combustible gas also provides other benefits such as a lowering of flame temperature and hence $NO_x$ formation and a reduction of the quantity of cooling air required for the gas turbine expander.

Nitrogen addition to improve IGCC thermodynamic efficiency is discussed in a paper entitled "Air separation integration for IGCC Plants" by Union Carbide, General Electric and Texaco at the 10th EPRI Gasification Conference in October 1991.

EP-A-034781 discloses the use of a deliberate fuel gas pressure drop to assist in adding non-combustible water vapour to the fuel gas in a saturator.

However, these schemes use mainly waste heat from the gasifier to preheat a mixture of a fuel and a non-combustible gas stream before passing to the gas turbine.

U.S. Pat. No. 4,202,167 & EP-A-0259114 disclose IGCC processes of the type to which the present invention relates but do not disclose or suggest the step of reducing the pressure of the shifted gas stream by passing the gas stream through a specific pressure reduction device. In EP-A-0259114 a pressure reduction does take place between the quenching unit and the resaturator but only as a result of ordinary line pressure drop.

SUMMARY OF THE INVENTION

In accordance with the present invention there is provided a process for the production of power from a carbonaceous fuel using an IGCC process, which comprises partially oxidising the fuel with oxygen or an oxygen-containing gas to yield a gas stream containing carbon monoxide at supra-atmospheric pressure; downstream of the oxidising step directly quenching said gas stream with water thus increasing the steam content of the gas stream and then subjecting the gas stream to a catalytic carbon monoxide shift reaction whereby steam is converted into hydrogen and at least some of the carbon monoxide is converted into carbon dioxide with a consequent evolution of heat, wherein at least some of the shift heat evolved is used to reheat the shifted gas stream after it has been cooled and passed through a sulphur depleting step and after adding a non-combustible gas stream to the shifted gas stream; and then substantially completely combusting at least a major portion of the reheated mixture of non-combustible and shifted sulphur-depleted gas stream with additional oxygen or an oxygen-containing gas to produce power, characterised by the further step of reducing the pressure of the cooled shifted gas stream before or after adding the non-combustible gas stream by passing the stream through a specific pressure reduction device.

Preferably the non-combustible gas stream is added to the sulphur depleted pressure reduced shifted gas stream.

The present invention also provides a plant for carrying out the above processes, and the power produced is in the form of shaft power, the majority of which is preferably converted into electricity.

This invention provides an improvement in IGCC thermodynamic efficiency by preheating the mixture of fuel gas and a non-combustible gas fed to the gas turbine using catalytic shift heat from a reactor situated downstream of the gasification step. The invention uses a quench gasifier followed by a shift, and gas turbine feed gas preheat, to increase the proportion of power generated by the gas turbine.

It is well known to use a dry gas steam raising boiler to recover waste heat from the gasifier. The waste heat is then utilised in the steam turbine rather than the gas turbine. This invention preferably uses gasification waste heat in the gas turbine which is a more efficient generator of power than the steam turbine.

The advantageous use of a carbon monoxide shift reactor in an IGCC plant has been disclosed by others. In European Patent No. 0259114B1 issued to Nurse a shift reactor is placed after a quench gasifier but the heat generated by the shift reactor is used to preheat gas turbine fuel gas before expansion in a separate expander to the gas turbine. U.S. Pat. No. 4,202,167 issued to Suggitt and Gilmer discloses the use of the shift to remove undesirable nickel compounds from fuel gas.

However, in the present invention the shift is used to raise the proportion of power generated by the gas turbine and hence to increase IGCC thermodynamic efficiency. Gasification waste heat is used first in a quench to produce water vapour admixed with the fuel gas. This gas/water vapour mixture is then subjected to an exothermic catalytic shift reaction and the major part of the sensible heat produced thereby is preferably passed on to the gas turbine rather than to the steam turbine in the form of raised steam.

The preheat for the shift may be supplied by means such as through interchange with hot water, steam or the main gas stream or another gas stream.

Some heat may be recovered from the gas/steam mixture leaving the quench by heat exchange such as with other gas streams or can be used to raise steam.

The shifted gas stream is reduced in pressure before or after sulphur depletion, preferably by expansion. Such expansion may be in an expansion turbine to produce shaft power and preferably this is effected prior to the addition of a non-combustible gas stream to the shifted gas stream. This non-combustible gas stream improves the heat carrying capacity of the fuel gases fed to the gas turbine.

Some heat released by the shift reaction may be used for other purposes such as steam superheating, steam raising, heating boiler feed water, heating other gas streams such as that between the sulphur removal unit and the expansion turbine, or for supplying heat for a water saturation system. Preferably the majority of the shift heat is used for preheating fuel gases to the gas turbine.

The non-combustible gas can be nitrogen or carbon dioxide or steam, or a mixture of two or more of these.

DESCRIPTION OF THE PREFERRED EMBODIMENTS

Figure 1A:
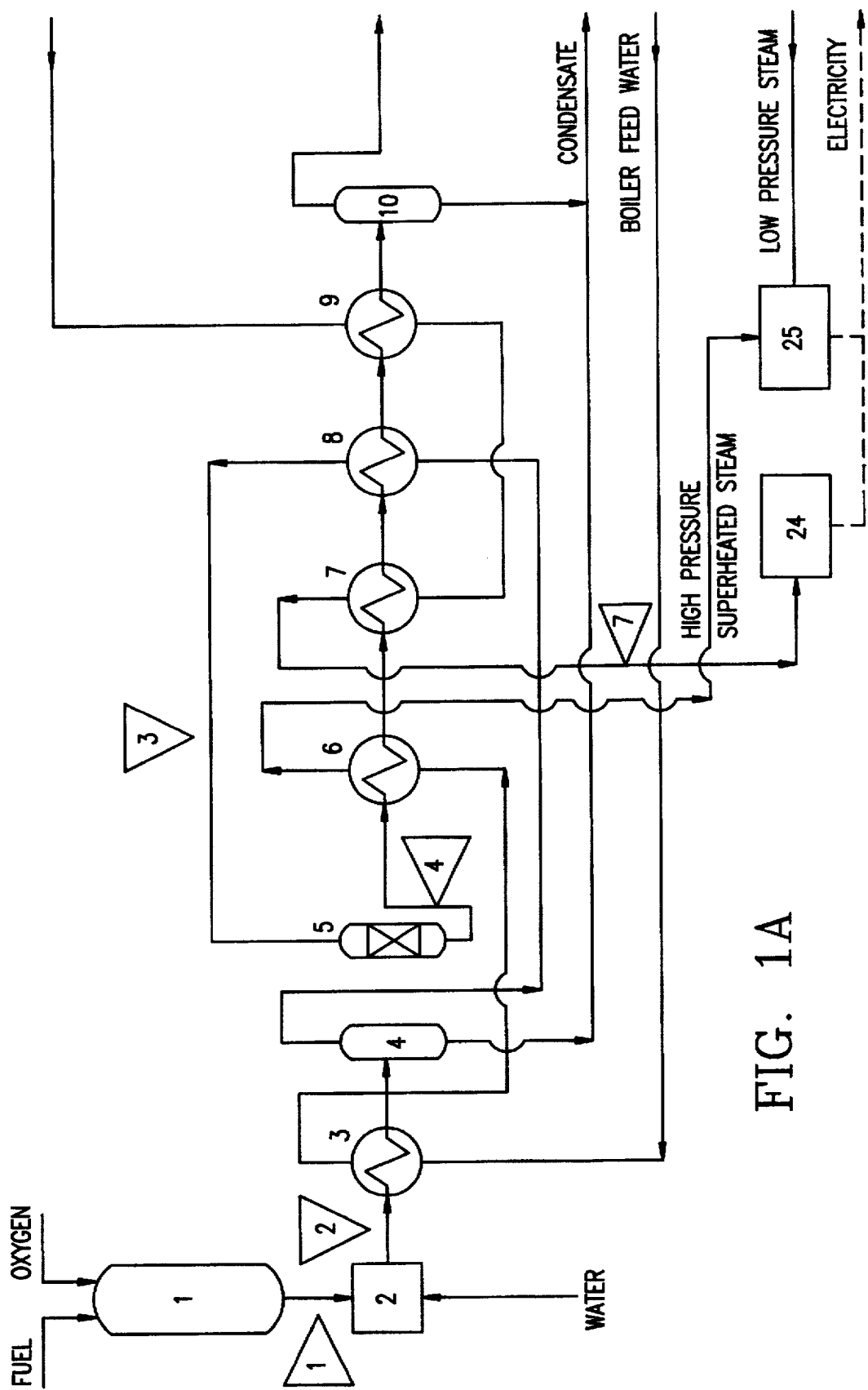
FIGS. 1A and 1B combine to form a schematic flowsheet showing a first embodiment of the present invention using a fuel gas/water vapour mixture to carry sensible heat into the gas turbine.

The present invention involves the increase of the proportion of power generated in an IGCC process by the gas turbine over that proportion of power generated by the steam turbine. Because the thermodynamic efficiency of the gas turbine is intrinsically higher than that of the steam turbine the IGCC thermodynamic efficiency is thereby increased. The process of the invention eschews the use of gasification waste heat to raise steam but, rather, uses this waste heat in the quench to provide suitable conditions for a shift reaction and then uses at least part of the heat evolved in the shift reaction to preheat the fuel gases passing into the gas turbine.

This present inventive concept can be effectively applied, for example, in an IGCC process containing a water saturation system to increase the heat carrying capacity of the fuel gas. In the following paragraphs, the process of the present invention is described using two embodiments.

In the first embodiment, the fuel gas stream is resaturated with water vapour after sulphur removal in order to increase its heat carrying capacity. In the second embodiment, the heat carrying capacity of the fuel gas stream is increased by the addition of nitrogen gas after the sulphur removal stage.

A first embodiment of the present invention will now be described by way of example with reference to FIG. 1 of the accompanying drawings and Table 1 below.

The fuel consisting of a liquid hydrocarbon refinery residue or an emulsion of hydrocarbons and water is reacted with 95% by volume pure oxygen at a pressure of 70 bar in a partial oxidation unit (1). The resulting mixture of gases is quenched (2) using an excess of water, i.e. not all of the water evaporates, down to the saturation condition at a pressure of 63 bar and at 243° C. This quench step is therefore a gas washing step in addition to a gas cooling step.

The gas produced after quenching is referred to as Stream 2 in Table 1 anti passes through a knockout pot (4) and a heat exchanger (8) before entering the shift catalyst reactor (5). The small interchange heat exchanger (8) is used to preheat the inlet gas/steam mixture. This is to help initiate the shift reaction and to prevent steam condensing on the shift catalyst.

Figure 1B:
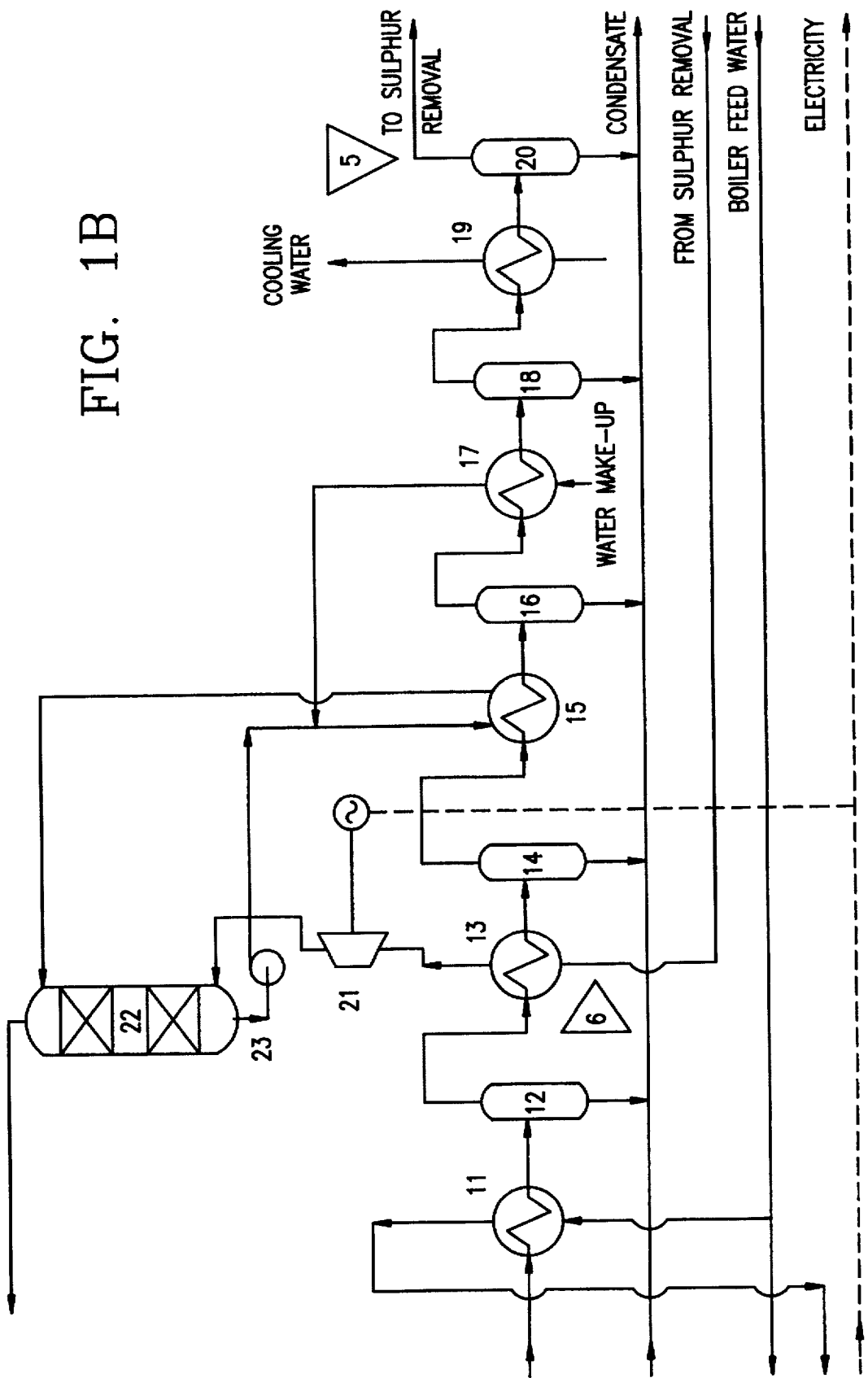

In FIG. 1 high pressure steam at 21 bar is first raised in boiler (3) following the partial oxidation reaction (1) and quench (2) partly to adjust the steam/gas ratio and also to permit temperature control before the shift reaction which takes place at a temperature of from 260° C. to 472° C. Some of the heat released in the exothermic shift reaction is used in exchanger (8) to superheat the steam raised by boiler (3) to 340° C. After heat interchange with the shift reactor inlet gases in interchanger (8) the gas stream is used in exchangers (7) and (9) to preheat the sulphur-depleted water-saturated gases to 390° C. before said gases are fed as fuel gas to the gas turbine (24).

After the final fuel gas preheater exchanger (9) low pressure steam at 7 bar is raised by boiler (11). Both the high pressure superheated steam from exchangers (3) and (6) and the low pressure stem from boiler (11) are fed to the steam turbine (25) associated with the gas turbine (24).

Water condensate is collected in knockout pots (4), (10) and (12) and the condensate is recirculated to the quench (2) together with make-up water.

The fuel gas is further cooled by heat exchange with sulphur depleted fuel gas in exchanger (13), by a water circuit exchanger (15), by make-up water exchanger (17) and finally by a cooling water exchanger (19). Water condensate is collected in knock-out pots (14), (16), (18) and (20) and the condensate recirculated to the quench (2).

The cooled fuel gas is then passed to a conventional sulphur removal unit (not shown) where the sulphur compounds contained in the fuel gas are selectively removed. The sulphur depleted fuel gas is then reheated to 125° C. in exchanger (13) and expanded in a gas expander (21) to a pressure of 21 bar. The shaft power from the gas expander (21) is used to generate electric power.

The low pressure sulphur depleted fuel gas is then passed through a saturator (22) associated with recycling pump (23) where the fuel gas is saturated with water vapour at an exit temperature of 127° C. The saturated fuel gas is then superheated by heat exchange with the hot shifted fuel gas in exchangers (9) and (7) to 390° C. before passing to the gas turbine (24).

Mass and energy balances for the main streams labelled 1 to 7 in FIG. 1 are recited in Table 1 below for a specific example of this embodiment.

A second embodiment of the present invention will now be described by way of example with reference to FIG. 2. The same reference numbers are used to denote the same items as in FIG. 1.

As in FIG. 1 the fuel consisting of a liquid hydrocarbon refinery residue or an emulsion of hydrocarbons and water is reacted with oxygen at pressure in a partial oxidation unit (1). The resulting mixture of gases is quenched (2) using an excess of water, i.e. not all of the water evaporates, down to the saturation condition. This quench step is therefore a gas washing step in addition to a gas cooling step.

Again, shift catalyst reactor (5) has a small interchange heat exchanger (8) to preheat the inlet gas/steam mixture. This is to help initiate the shift reaction and to prevent steam condensing on the shift catalyst. Such preheat may be supplied by other means such as through interchange with hot water, steam or another gas stream.

Heat is recovered from the gas/steam mixture leaving quench (2) by a series of heat exchangers (6, 7, 8, 9) in order to heat other gas streams or to raise steam.

Figure 2A:
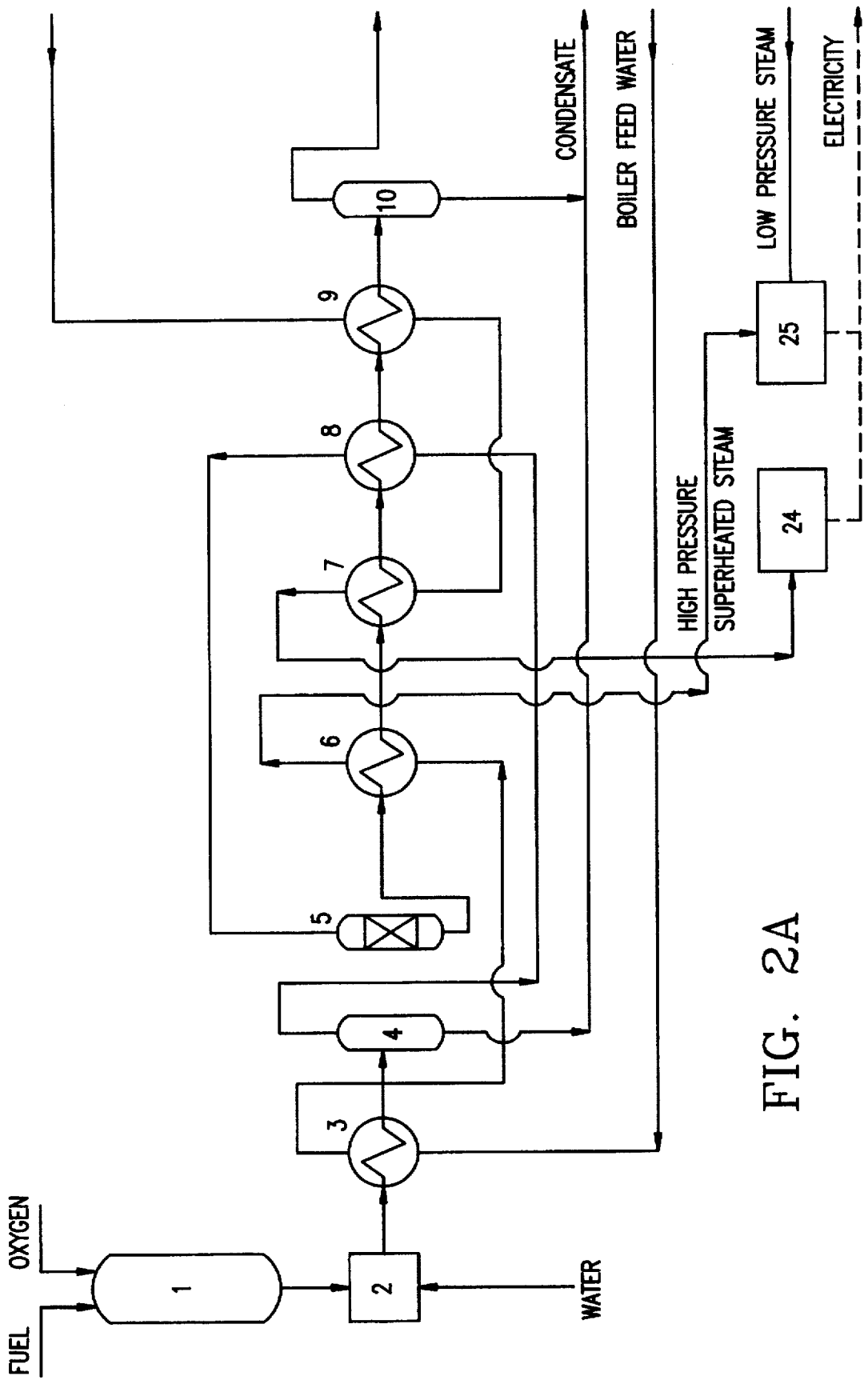
FIGS. 2A and 2B combine to form a schematic flowsheet of a second embodiment of the present invention using a fuel gas/non-condensible, non-combustible gas mixture to carry sensible heat into the gas turbine.
Figure 2B:
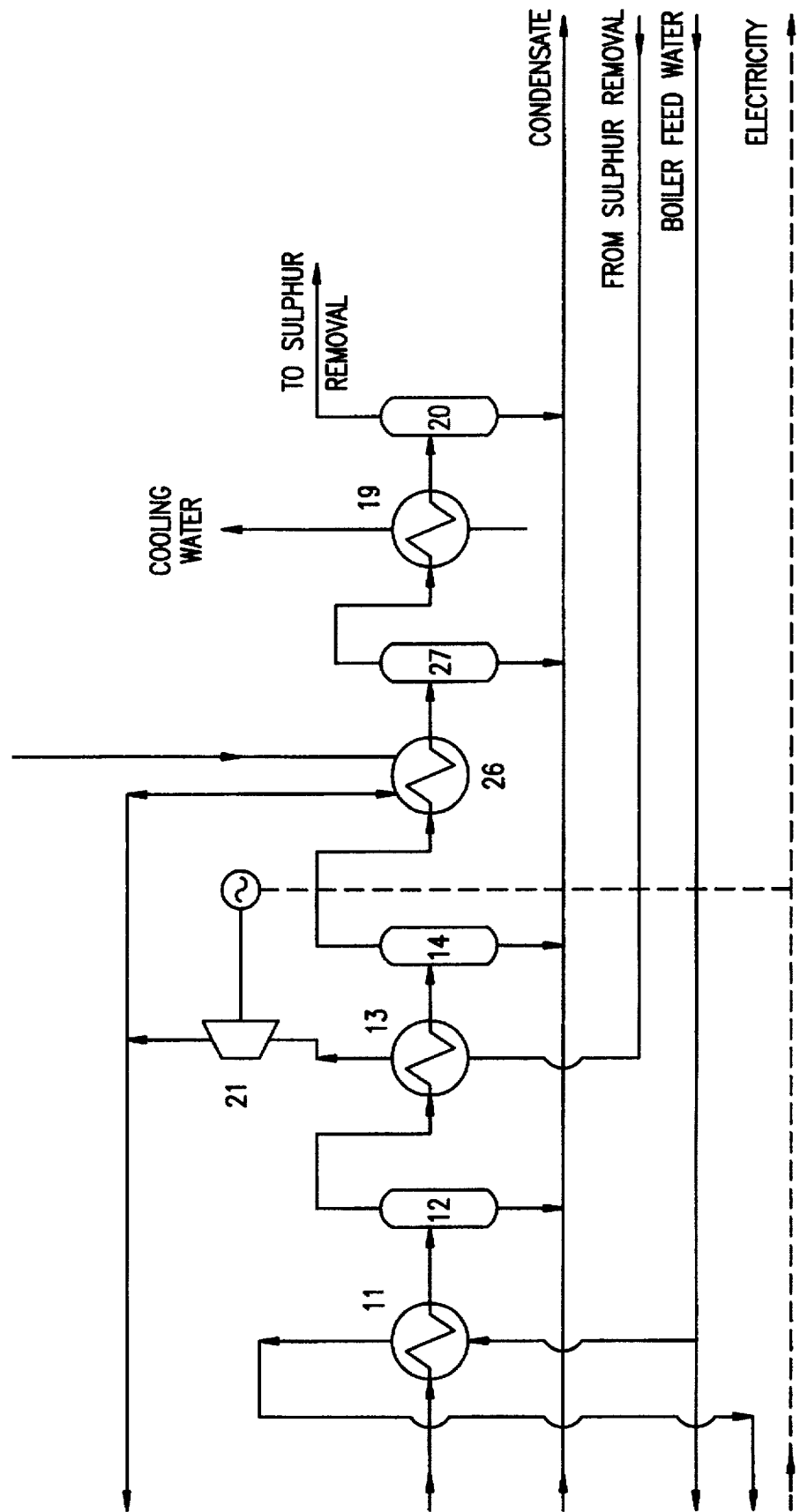

In the embodiment shown in FIG. 2 high pressure steam is first raised in boiler (3) following the partial oxidation reaction (1) and quench (2) partly to adjust fie steam/gas ratio and also to permit temperature control before the shift reaction. Some of the heat released in the exothermic shift reaction is used in exchanger (6) to superheat the stem raised in boiler (3). After heat interchange with the shift reactor inlet gases in interchanger (8) the gas stream is used to preheat in exchangers (7) and (9) the sulphur depleted water saturated gases mixed with nitrogen before said mixture is fed as fuel gas to the gas turbine (24).

After the final fuel gas preheater exchanger (9) low pressure steam is raised in boiler (11). Both the high pressure superheated steam from exchanger (6) and the low pressure steam from exchanger (11) are fed to the steam turbine (25) associated with the gas turbine (24).

Water condensate is collected in knockout pots (4), (10) and (12) and the condensate is recirculated to the quench (2) together with make-up water.

The fuel gas is further cooled by heat exchange with sulphur depleted fuel gas in exchanger (13), by a nitrogen feedstream heater (26) and finally by a cooling water exchanger (19). Water condensate is collected in knock-out pots (14), (27) and (20) and the condensate recirculated to the quench (2).

The cooled fuel gas is then passed to a conventional sulphur removal unit (not shown) where me sulphur compounds contained in the fuel gas are selectively removed. The sulphur depleted fuel gas is then reheated in exchanger (13) and expanded in a gas expander (21). The shaft power from the gas expander (21) is used to generate electric power.

A stream of nitrogen preheated in exchanger (26) is then added to the low pressure sulphur depleted fuel gas and the mixture superheated by heat exchange with the hot shifted fuel gas in exchangers (9) and (7) before passing to the gas turbine (24).

TABLE 1

| | | STREAM NUMBER | | | | | | | |
|---|---|---|---|---|---|---|---|---|---|
| | | 1 Gasflow Product | | 2 Scrubbed Raw Gas | | 3 Shift Feed | | 4 Shifted Gas | |
| COMPONENTS | Mol. Wt. | kgmol/h | mol % | kgmol/h | mol % | kgmol/h | mol % | kgmol/h | mol % |
| Methane | 16.043 | 21.07 | 0.24 | 21.07 | 0.24 | 21.07 | 0.24 | 21.07 | 0.17 |
| Hydrogen | 2.016 | 3534.47 | 40.25 | 3534.47 | 40.25 | 3534.47 | 40.25 | 6837.87 | 50.50 |
| Carbon Monoxide | 28.010 | 4348.29 | 40.52 | 4348.29 | 40.52 | 4348.29 | 40.52 | 1044.80 | 8.04 |
| Carbon Dioxide | 44.010 | 610.14 | 0.05 | 610.14 | 0.05 | 610.14 | 0.05 | 3010.20 | 32.42 |
| Nitrogen | 28.013 | 54.18 | 0.02 | 54.18 | 0.04 | 54.18 | 0.02 | 54.18 | 0.45 |
| Argon | 30.948 | 92.20 | 1.05 | 92.20 | 1.05 | 92.20 | 1.05 | 92.20 | 0.70 |
| $H_2S$ | 34.078 | 114.17 | 1.30 | 114.17 | 1.30 | 114.17 | 1.30 | 119.83 | 0.09 |
| COS | 60.070 | 6.39 | 0.07 | 6.39 | 0.07 | 6.39 | 0.07 | 0.73 | 0.01 |
| TOTAL-DRY | | 8780.01 | 100.00 | 8780.01 | 100.00 | 8780.01 | 100.00 | 12080.07 | 100.00 |
| Water | 18.015 | 1234.88 | | 12400.47 | | 7002.82 | | 4503.78 | |
| TOTAL-WET | | 10015.79 | | 21190.38 | | 16083.73 | | 16083.73 | |
| Total Mass Flow (kg/h) | | 187833 | | 389143 | | 307050 | | 307050 | |
| Molecular Weight (wet) | | 18.75 | | 18.38 | | 18.40 | | 18.40 | |
| Potential Power (MW/MCV) | | 601 | | 601 | | 601 | | 504 | |

| | | STREAM NUMBER | | | | | |
|---|---|---|---|---|---|---|---|
| | | 5 AGR Feed | | 6 AGR Product Membrane Feed | | 7 Gas Turbine Fuel | |
| COMPONENTS | Mol. Wt. | kgmol/h | mol % | kgmol/h | mol % | kgmol/h | mol % |
| Methane | 16.043 | 21.07 | 0.17 | 21.07 | 0.18 | 21.07 | 0.18 |

TABLE 1-continued

| | | | | | | | |
|---|---|---|---|---|---|---|---|
| Hydrogen | 2.016 | 6837.87 | 50.50 | 6837.87 | 57.13 | 6837.87 | 57.13 |
| Carbon Monoxide | 28.010 | 1044.80 | 8.04 | 1044.80 | 8.73 | 1044.89 | 8.73 |
| Carbon Dioxide | 44.010 | 3010.20 | 32.42 | 3010.20 | 32.74 | 3010.20 | 32.74 |
| Nitrogen | 28.013 | 54.18 | 0.45 | 54.18 | 0.45 | 54.18 | 0.45 |
| Argon | 39.048 | 92.20 | 0.70 | 92.20 | 0.77 | 92.20 | 0.77 |
| $H_2S$ | 34.078 | 119.83 | 0.09 | 0.64 | 0.0045 | 0.64 | 0.0045 |
| COS | 60.070 | 0.73 | 0.01 | 0.00 | 0.00 | 0.00 | 0.00 |
| TOTAL-DRY | | 12089.97 | 100.00 | 11969.95 | 100.00 | 11969.95 | 100.00 |
| Water | 18.015 | | 25.18 | | 8.26 | | 1823.02 |
| TOTAL-WET | | | 12115.15 | | 11978.21 | | 13702.97 |
| Total Mass Flow (kg/h) | | | 225658 | | 221281 | | 253938 |
| Molecular Weight (wet) | | | 18.03 | | 18.47 | | 18.41 |
| Potential Power (MW/MCV) | | | 504 | | 546 | | 546 |

I claim:

1. A process for the production of power from a carbonaceous fuel in an IGCC plant, which comprises partially oxidizing the fuel with oxygen or an oxygen-containing gas to yield a hot gas stream containing carbon monoxide at supra-atmospheric pressure; directly quenching said hot gas stream with water thus cooling the gas stream and increasing its steam content; subjecting the quenched gas stream to a carbon monoxide shift reaction whereby at least some of its carbon monoxide and steam is converted into carbon dioxide and hydrogen with a consequent evolution of heat; recovering a portion of said evolved heat and cooling the quenched shifted gas stream; passing the cooled quenched shifted gas stream through a sulphur depleting step; reducing the pressure of the cooled quenched shifted sulphur-depleted gas stream to produce a reduced pressure gas stream; adding a non-combustible gas stream to the reduced pressure gas stream to produce a mixture; heating said mixture with heat recovered from said shift reaction; and then substantially completely combusting at least a major portion of the mixture with additional oxygen or an oxygen-containing gas to produce power; said process being carried out with the proviso that no substantial pressure reduction takes place between said shift reaction and the recovery of heat therefrom so that the amount of heat available to heat said mixture prior to combustion is enhanced.

2. A process as claimed in claim 1 wherein the non-combustible gas is water vapor.

3. A process as claimed in claim 2 wherein de water vapor is added by means of a saturator.

4. A process as claimed in claim 1 wherein the non-combustible gas is nitrogen.

5. A process as claimed in claim 1 wherein the non-combustible gas is carbon dioxide.

6. A process as claimed in claim 1 wherein the non-combustible gas is a mixture of two or more of water vapor, nitrogen and carbon dioxide.

7. A process as claimed in any one of the preceding claims which further comprises the step of passing the quenched stream through a boiler to raise steam prior to subjecting the quenched stream to said exothermic shift reaction.

8. A process as claimed in any one of claims 1–6 wherein said pressure reduction is carried out in an expansion engine to produce shaft power.

9. Power in the form of electricity produced by an IGCC process as claimed in any one of claims 1–6.

10. The method of claim 1 wherein the amount of evolved heat which is recovered is a major portion of said evolved heat.

* * * * *